(12) United States Patent
Stewart et al.

(10) Patent No.: US 9,740,587 B2
(45) Date of Patent: Aug. 22, 2017

(54) DISTRIBUTING POWER USAGE DATA FOR LOW-LEVEL COMPONENTS OF A COMPUTING DEVICE TO SUBSCRIBING PROGRAMS

(75) Inventors: Christopher H Stewart, Houston, TX (US); Nazih H Hage, Houston, TX (US); Jon P Styskal, Houston, TX (US); Jennifer Rios, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 295 days.

(21) Appl. No.: 13/876,135

(22) PCT Filed: Jan. 28, 2011

(86) PCT No.: PCT/US2011/022852
§ 371 (c)(1),
(2), (4) Date: Mar. 26, 2013

(87) PCT Pub. No.: WO2012/102727
PCT Pub. Date: Aug. 2, 2012

(65) Prior Publication Data
US 2013/0185583 A1    Jul. 18, 2013

(51) Int. Cl.
*G06F 1/26* (2006.01)
*G06F 1/32* (2006.01)
*G06F 11/30* (2006.01)
*G06F 9/54* (2006.01)

(52) U.S. Cl.
CPC ......... *G06F 11/3062* (2013.01); *G06F 9/542* (2013.01); *G06F 9/545* (2013.01)

(58) Field of Classification Search
CPC ....... G06F 11/3062; G06F 9/545; G06F 9/542
See application file for complete search history.

(56) References Cited

U.S. PATENT DOCUMENTS

| | | | |
|---|---|---|---|
| 5,559,870 A | 9/1996 | Patton et al. | |
| 5,586,333 A | 12/1996 | Choi et al. | |
| 5,870,605 A | 2/1999 | Bracho et al. | |
| 7,472,396 B2 * | 12/2008 | Jacobs | G06F 9/542 710/260 |
| 7,650,404 B2 * | 1/2010 | Parupudi | G06F 9/542 709/223 |
| 2002/0009188 A1 * | 1/2002 | Rosset et al. | 379/221.15 |
| 2002/0178387 A1 | 11/2002 | Theron et al. | |
| 2003/0126475 A1 | 7/2003 | Bodas et al. | |

(Continued)

FOREIGN PATENT DOCUMENTS

| | | |
|---|---|---|
| CN | 1834936 | 9/2006 |
| CN | 101706555 A | 5/2010 |
| TW | 201033832 | 9/2010 |
| TW | 201101243 | 1/2011 |

(Continued)

OTHER PUBLICATIONS http://download.intel.com/pressroom/kits/embedded/pdfs/Core__.i5-660_Corei3-540.pdf.

(Continued)

*Primary Examiner* — Zahid Choudhury
(74) *Attorney, Agent, or Firm* — HP Patent Department

(57) ABSTRACT

Example embodiments disclosed herein relate to distributing information. A set of information about components of a computing device is retrieved from a low-level system of the computing device. Programs are determined to be sent data based on the set of information.

19 Claims, 6 Drawing Sheets

(56) References Cited

U.S. PATENT DOCUMENTS

| | | | |
|---|---|---|---|
| 2004/0025067 A1 | 2/2004 | Gary et al. | |
| 2007/0005996 A1* | 1/2007 | Nalawadi | G06F 1/206 |
| | | | 713/300 |
| 2007/0220107 A1* | 9/2007 | Reisman | 709/217 |
| 2009/0036102 A1* | 2/2009 | Ho | 455/412.2 |
| 2010/0010857 A1 | 1/2010 | Fadell | |
| 2010/0017242 A1 | 1/2010 | Hamilton, II et al. | |
| 2010/0094476 A1 | 4/2010 | Hamilton et al. | |
| 2011/0022870 A1* | 1/2011 | McGrane | G06F 1/3203 |
| | | | 713/340 |
| 2011/0195695 A1* | 8/2011 | Gupta | H04L 67/04 |
| | | | 455/414.1 |

OTHER PUBLICATIONS http://www.dell.com/downloads/global/power/ps2q10-20100363-eddmc.pdf; Publication Date: 2010; Todd Rodgers; Tad Walsh.

http://www.hectronic.se/website1/embedded/an-adapted-bios-saves-power.../an-adapted-l.

Notification of Transmittal of the International Search Report and the Written Opinion of the International Searching Authority, or the Declaration, Cited in PCT/US2011/022852, Mailed Sep. 29, 2011, 9 pages.

Office Action, CN Application No. 201180051000.9, Date: Jun. 2, 2015, pp. 1-7.

* cited by examiner

DISTRIBUTING POWER USAGE DATA FOR LOW-LEVEL COMPONENTS OF A COMPUTING DEVICE TO SUBSCRIBING PROGRAMS

BACKGROUND

Service providers and manufacturers are challenged to deliver quality and value to consumers, for example by providing various capabilities in computing devices, such as providing features to users. Such features can be based on information collected about the computing devices. For example, component information, such as power information, of a computing device can be utilized to provide power efficiency features for the computing device.

BRIEF DESCRIPTION OF THE DRAWINGS

The following detailed description references the drawings, wherein.

DETAILED DESCRIPTION

Figure 1:
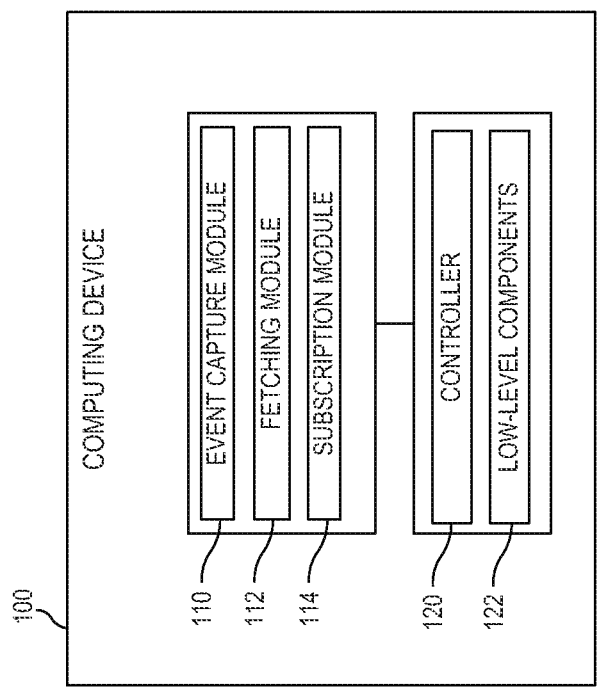
FIG. 1 is a block diagram of a computing device including modules to distribute information collected at a low-level system of the computing device, according to one example.

As noted above, businesses, such as manufacturers and service providers, and consumers may desire functionality in computing devices that include features that utilize information collected by the computing device. For example, expirable data, power usage data, or other time-sensitive data of a computing device can be utilized to enable various features of the computing device. In certain embodiments, time-sensitive data is data that's utility is diminished once a condition occurs. Example conditions can include when a particular event occurs, such as when a time threshold is met, a countdown timer is met, or the like. Further, other events can be utilized to cause data to expire, such as the event of reading or otherwise providing the data. When the expirable data is read, it can be marked as expired. When data is expired, it can be rewritten with a new set of data. Moreover, data can be considered time-sensitive if the data is relevant or applicable (for example, unexpired) for a short period of time. For example, power usage data may become irrelevant to a particular program once the data has been read by another program. Although various examples are described using power usage data, it is contemplated that the approaches used herein can be utilized with other types of information that can be collected by a low-level system.

A low-level system of the computing device can be used to collect such data. In certain embodiments, the low-level system is a collection of components of the computing device where the individual components are primarily concerned with their functionality. The low-level system can include components that can be utilized to measure and/or provide measurement data to programs or services that may be interested in the data.

Various embodiments disclosed herein relate to distributing expirable data collected at a low-level system. The low-level system can determine a set of data relating to a computing device. The set can include expirable data and may be collected by control logic and stored in a memory. Control logic can include a processor, a logic chip, a chip set, combinations thereof, etc. The control logic can be connected to a circuit utilized in determining the expirable data (for example, a power circuit). The control logic can store the expirable data in the memory until the data expires. Further, the data can expire based on a condition or event as described above. In this manner, the control logic can determine that the data has been read (for example, based on the sending of the data to another component of the computing device, such as a high-level system component). In certain scenarios, the expiration of the data can result in the data being deleted, marked by a flag, or otherwise marked as expired. Once the data is expired, another set of data can be collected.

A high-level system can be utilized to retrieve the set of data from the low-level system. In certain embodiments, a high-level system can utilize low-level system components. The high-level system can, for example, utilize multiple system components and may have knowledge of the actions performed by the system components. Further, in certain examples, a high-level system can include machine-readable instructions that, when executed may include multiple machine-language instructions. For example, the high-level system can include software code that is executable on a higher level than the low-level system. Such a high-level system can operate on an operating system level of the computing device. Moreover, the high-level system may have access to more components and/or resources than the lower-level system. For example, the high-level system may be able to utilize a main memory of the computing device while the low-level system may be limited to an internal memory or a separate memory chip.

When the high-level system retrieves the set of data, the high-level system can determine a program or multiple programs to send the set of data to. This can be based on criteria. For example, the high-level system can keep track of programs to provide the set of data to based on a table or based on a publish/subscribe mechanism. The programs can register with the high-level system to receive messages to the set of data. Then, the high-level system can publish the set of data to the programs when the set is retrieved or based on another event. The high-level system may provide an application programming interface (API) to allow the programs to register or unregister subscriptions to the data and provide notifications including the data.

In one embodiment, the high-level, low-level system structure can be utilized to monitor and report power usage data for a computing device. This can be advantageous for performing functions according to rules on for example, a limited battery power computing device (for example, a cellular phone, a laptop, a tablet, etc.). Reporting can take the form of reporting battery depletion so that users may find a battery recharging station before the battery is exhausted. Further, power management systems can actively reduce power in the computing device by turning off individual components (for example, a wireless radio, a hard drive, a screen, or the like) in order to improve battery life when the components are not in use.

Determining whether a component is in use or power consumption information associated with a component can be based on a report. Reports may be based on battery level consumption, predictive models of individual components, actual readings of individual components, or the like. Actual readings of individual components can be determined by having the component report the information collected by the component or by attaching a circuit to the component to take the reading. For example, a basic input output system (BIOS) may be utilized as a low-level system to collect power consumption data from a power consumption circuit or a particular component. The high-level system can provide this collected data to other programs.

Referring now to the drawings, FIG. 1 is a block diagram of a computing device including modules to distribute information collected at a low-level system of the computing device, according to one example. In this example, the computing device 100 includes an event capture module 110, a fetching module 112, a subscription module 114, a controller 120, and low-level components 122. Further, in certain examples, the computing device 100 can include a processor, a power supply, memory, a storage interface, input/output interfaces, an operating system, and other components. In one embodiment, the event capture module 110, fetching module 112, and subscription module 114, can be a part of a high-level system of the computing device 100. Moreover, in one embodiment, the controller 120, and low-level components 122 can be a part of a low-level system of the computing device 100. The low-level system can further include, for example, a power monitor circuit and memory to hold sets of data. Computing device 100 may utilize the low-level system to collect and store power usage data and the high-level system module to distribute the power usage data and/or information based on power usage data to programs such as services and applications.

Computing device 100 may be a notebook computer, a slate computing device, a portable reading device, a wireless email device, a mobile phone, a desktop computer, a server, or any other computing device for which information about components of the computing device 100 may be beneficial to communicate to programs and services. In certain examples, a program is a sequence of instructions that when executed by a processor perform a specified task. These programs can use the received information to provide features for the computing device 100.

Computing device 100 may include a series of modules 110-114 for distributing device data. Each of the modules 110-114 may include, for example, hardware devices including electronic circuitry for implementing the functionality described below. In addition or as an alternative, each module may be implemented as a series of instructions encoded on a machine-readable storage medium of computing device 100 and executable by a processor or other circuitry. It should be noted that, in some embodiments, some modules are implemented as hardware devices, while other modules are implemented as executable instructions. A processor may be a central processing unit (CPU), graphics processing unit (GPU), or microprocessor suitable for retrieval and execution of instructions and/or electronic circuits configured to perform the functionality of some or any of the modules 110-114. Further, the controller 120 can be implemented by executing instructions in a similar manner.

The low-level system can be utilized to determine data about the computing device 100 and store the data in the low-level system memory. The low-level system memory can be a part of the controller 120. Moreover, the data can be time-sensitive. In certain examples, the data can include power usage data. Power usage data can be determined using a power monitor circuit or another component of the computing device 100. Additionally or alternatively, low-level components 122 of the computing device 100 (for example, a processor, a power supply, a storage interface, input/output interfaces, peripheral devices, etc.) can monitor the individual component's power usage and provide the power usage data. In certain scenarios, the power usage data includes information about components that may be part of the computing device 100, such as an output device (for example, a display), an input device (for example, a keyboard), other input/output devices (for example, network connection circuitry, wireless radios, etc.), storage, or the like.

Further, the controller 120 can be utilized to interface with the power monitor circuit or other low-level components 122 to determine and store the power usage data. Thus, in certain examples, the controller 120 determines power usage data for a component by receiving the power usage data from the power monitor circuit or the component itself. The memory associated with the low-level system may be limited. For example, in a laptop computing device, the device may have a primary processor and memory that includes a large amount of memory while some components of the laptop individually do not have access to the main memory, but instead have access to a separate memory that may be limited (for example, internal memory of the controller).

Because the memory may be limited, systems can be put in place to handle memory issues. For example, the low-level system can utilize an expiration scheme to expire sets of collected data when read. This allows for reuse of the memory space. However, if the set expires using this approach, the current set of data can be read once before a new set is generated. This means that if two programs want to read the memory, each would get different results.

Programs associated with the computing device 100 may be interested in the power usage data collected by the low-level system. These programs may be associated with the operating system or be separate. Further, these programs can add functionality based on information gathered by the low-level system. For example, in the case of a laptop computing device, a power management program can monitor power information to provide additional functionality.

A power supply may be used to provide power to the computing device 100. The power supply can include a plug-in supply, a battery supply, a combination thereof, etc. In the case where the power of the computing device 100 is based on an exhaustible supply (for example, a battery), the power management program can be utilized to shut off components to increase battery life. In some scenarios, different programs can provide different functionality utilizing the same information. For example, different programs can be utilized to control different components (for example, one program can be associated with a video interface while another program is associated with a wireless radio) of the computing device 100. These programs may find the same information (for example, battery usage information) useful in making determinations.

The high-level system can be utilized to interface between the low-level system and the programs. The programs and/or operating system may register or subscribe with the high-level system via the subscription module 114. The subscription module 114 can initiate and monitor routing of information to the programs. Programs can subscribe to information by sending a request to register for particular information based on an event. The subscription module 114 receives the registration request and can generate, update, or modify a data structure to link the program, the event, the type of information requested, or a combination thereof. Then, when and/or if the event occurs, the high-level system can utilize a notification module to send the requested information to the program.

In one example, the data structure can include subscription information that can include the events for which the respective programs are interested. When an event fires, the programs subscribed to the event can be sent the set.

In another example, the subscription module 114 stores a data structure of subscription information including an identifier of each of the programs and associated information types for which the respective programs are interested. As such, if a set of data is collected that is associated with the information type; the corresponding programs interested in the information type can be determined to be sent.

In certain examples, the event capture module 110 can determine if and when to fetch the information. Events can occur based on a timer (for example, pull data from the low-level system during a regular interval) or other information (for example, the low-level system may send an interrupt to the high-level system to notify the event capture module 110 that the memory of the low-level system is ready to be read).

The high-level system utilizes the fetching module 112 to retrieve information from the low-level system, for example, via the controller 120. This can be accomplished using one of various commands or functions (for example, operating system functions, device drivers, etc.). When the information is read from the low-level system, the low-level system expires the set of information collected, for example, via the controller 120. As such, the current power usage data set is transmitted to the high-level system by the low-level system and the low-level system can begin to collect another set of information. When that set is ready, the high-level system reads the new set and the controller 120 expires the new set.

When power usage data is fetched by the fetching module 112, the subscription module 114 determines what programs should receive the power usage data or information based on the power usage data. Information based on the power usage data can include processed information, filtered information, raw information, formatted information, or the like. The subscription module 114 can make this determination based on the data structure of registered programs. Additionally or alternatively, the programs can request and receive the information.

In certain scenarios, the power usage data is processed. For example, the notification module can format the requested information or make calculations and/or provide summary information. A standard format, such as an Extensible Markup Language (XML) format can be utilized or proprietary formats, tables, etc. can be utilized. Then, the notification module can send the set or information based on the set to the appropriate programs.

With these approaches, the power usage data can be provided from a low-level system that expires information when read to multiple programs. An advantage of this approach is that expirable memory mechanisms can be utilized at the lower-level while storage and distribution of the information to other programs occurs at a higher-level.

Figure 2:
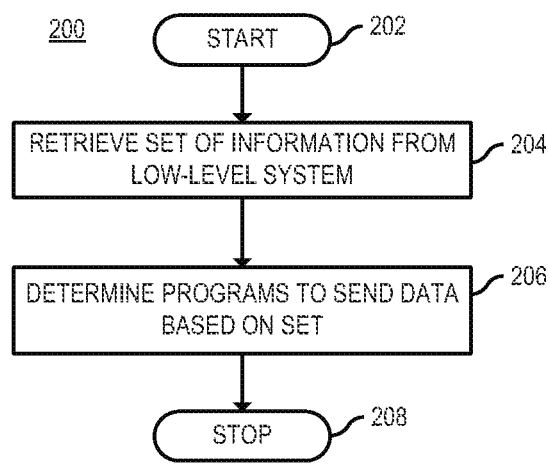
FIG. 2 is a flowchart of a method for publishing a set of power usage data collected from a low-level system, according to one example.

FIG. 2 is a flowchart of a method for publishing a set of power usage data collected from a low-level system, according to one example. The method 200 can be executed by a processor of a computing device or other suitable components. Additionally, the components for executing the method 200 may be spread among multiple devices (for example, nodes of the computing device). Method 200 may be implemented in the form of executable instructions stored on a machine-readable storage medium, and/or in the form of electronic circuitry.

Method 200 may start at 202 and proceed to 204, where a high-level system of the computing device retrieves a set of information (for example, power usage data) about a plurality of low-level components of the computing device from a low-level system component. The set can be stored at the low-level system, for example at a controller. Further, the set of power usage data can correspond to multiple low-level components of the computing device. The low-level components can include, for example, at least one of a networking module, a storage module, a presentation module, and a processor. The power usage data can further include power usage of part of a component or the whole component. For example, the power usage data can have information about a wireless component of the networking module as well as a wired component. In a similar manner, the storage module may include power usage data of a storage interface, storage devices, combinations thereof, etc. and the presentation module can include power usage data of a display as well as graphical processing components.

At 206, the high-level system determines a plurality of programs to send data. The data can be based on the set. For example, the data can include information that is based on the set, such as processed information. The programs can be based on subscription information for services or programs that are interested in the information. The subscription information may be determined by processing a data structure including a subscription status for the services, programs, etc. In one scenario, the subscription information can include an identifier of the service, a type of information the service is interested in, an associated event that when triggered causes the information to be published to the service, or a combination thereof. Events can include each time a set of information is collected, be based on a timer, etc.

The high-level system publishes or sends the set to the programs based on the subscription information. Thus, the high-level system can determine to publish the set of power usage data to the services if respective subscriptions associated with the services indicate that the set should be published to the respective services. The publication can occur via an API to communicate with the services. The method 200 then proceeds to 208, where the method ends.

Figure 3:
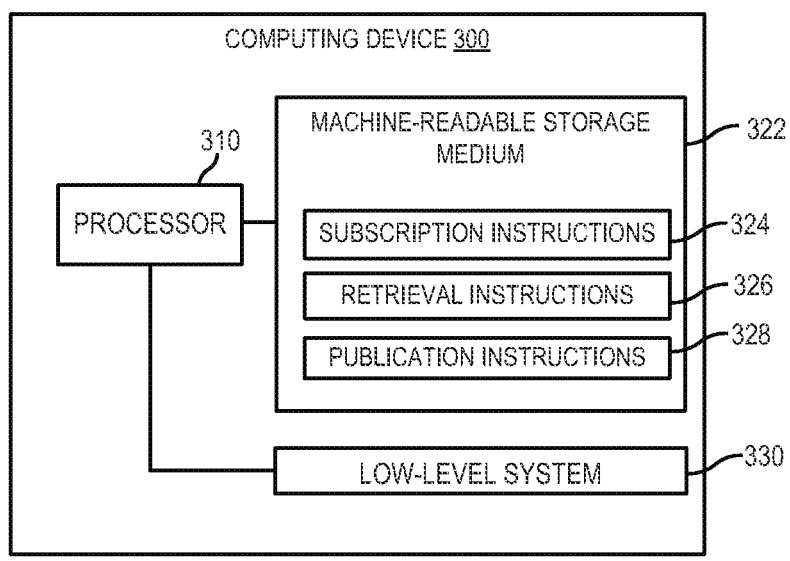
FIG. 3 is a block diagram of a computing device capable of distributing information collected at a low-level system, according to one example.

FIG. 3 is a block diagram of a computing device capable of distributing information collected at a low-level system, according to one example. The computing device 300 includes, for example, a processor 310 and a machine-readable storage medium 322 including instructions 324, 326, 328 for retrieving and distributing expirable information. The instructions 324, 326, 328 can further be a part of a high-level system of the computing device 300. Computing device 300 may be, for example, a notebook computer, a slate computing device, a portable reading device, a wireless email device, a mobile phone, a desktop computer, a server, or any other computing device.

Processor 310 may be, at least one CPU, at least one semiconductor-based microprocessor, at least one GPU, other hardware devices suitable for retrieval and execution of instructions stored in machine-readable storage medium, or combinations thereof. For example, the processor 310 may include multiple cores on a chip, include multiple cores across multiple chips, multiple cores across multiple devices (for example, if the computing device 300 includes multiple node devices), or combinations thereof. Processor 310 may fetch, decode, and execute instructions 324, 326, 328 to implement retrieval and/or distribution of expirable information. As an alternative or in addition to retrieving and executing instructions, processor 310 may include at least one integrated circuit (IC), other control logic, other electronic circuits, or combinations thereof that include a number of electronic components for performing the functionality of instructions 324, 326, 328.

A machine-readable storage medium 322 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 322 can be non-transitory. The machine-readable storage medium 322 associated with the high-level system may be encoded with a series of executable instructions 324, 326, 328 to retrieve and distribute expirable data.

Further, a controller can be utilized to collect the expirable data at a low-level system 330 of the computing device 300. The controller can be implemented as a processor as described above. Moreover, in certain examples, the controller can include an internal memory (for example, a cache memory, a flash memory, RAM, etc.). The controller can collect the expirable data from low-level components. The low-level components may include a networking module, a storage module, a presentation module, a processing module, a power usage module, or the like. Power usage modules can further be associated with other modules and can report power usage information to the controller. The controller of the low-level system 330 can thus read the power usage information (for example, via analog or digital signals). Further, other circuits may be utilized to determine other types of expirable data, such as time-sensitive information, networking information, processing information, combinations thereof, or the like. The low-level system 330 can further be implemented utilizing a computer-readable storage medium including instructions that, if executed by the controller cause capture of the expirable data and/or interface with the high-level system.

The controller can thus execute information capture instructions to determine a set of data. In one scenario, the information capture instructions can be utilized to determine the set of data from a low-level component (for example, a radio, a display, etc.), a circuit (for example, a power usage circuit), or the like. Further, the controller may include a monitor to determine the data. The set can be determined by retrieving subsets of the data from the source and storing the data in a memory. The data can be stored based on a data structure. For example, the data structure can include a table of the collected data (for example, power consumption information), a timestamp associated with the collected data, a component associated with the collected data, a combination thereof, etc. In certain examples, the memory associated with the controller can become full or a memory space allotted for the set can become full. At that time, the memory space can be reused for additional data. Further, the set can be read according to interface instructions. The interface instructions, if executed by the controller can be utilized to communicate with the high-level system. Utilizing the interface instructions, the controller may send an event notification to the high-level system that the set is ready to be read. Additionally or alternatively, the controller can push the information to the high-level system or be read without sending the notification.

Retrieval instructions 326 may be utilized to cause the processor 310 to determine that an event that would cause the high-level system to retrieve the set of data has occurred. The retrieval instructions 326 may be utilized to determine to pull the set of data from the controller because an event has occurred. In certain examples, the event can be triggered based on a timer (for example, pull a set of data after a certain period), based on an event ready message from the low-level system 330, or the like. Further, the processor 310 can then retrieve the collected set of data from the low-level system 330 by utilizing the retrieval instructions 326. The retrieval instructions 326 can be utilized to cause the processor 310 to request and/or receive the set of data. In certain examples, the retrieval instructions 326 can utilize features of an operating system associated with the high-level system. For example, in a Windows® environment, a Windows® Management Instrumentation (WMI) interface or drivers can be utilized to communicate with the controller or other low-level components.

When the data is fetched, the low-level system 330 receives a request from the processor 310 for the set of data. In response to the request, the low-level system 330, for example via the controller, can provide the set of data to the processor 310 for the high-level system. Additionally or alternatively, the controller can utilize interface instructions to push the set of data without need for a request from the high-level system. When the set of data is provided, the set can be marked as expired or otherwise be expired. In one example, the expiration of the set can start the gathering of another set of the data to provide. Expiring the data can be advantageous because it keeps the processing needs of the controller small. As such, additional sets of data (for example, real-time power consumption data) can be stored in memory if, for example, the controller is limited in the amount of data it can store.

When the set of data is received at the high-level system, subscription instructions 324 can be utilized to determine a program or multiple programs to provide the set of data to. The subscription instructions 324 can be based on a publish/subscribe architecture. As such, the subscription instructions 324 can be utilized to register programs to receive information based on the set of data. A data structure can store the relationships between registered programs and events or other conditions.

Publication instructions 328 can be executed by the processor 310 to publish the set of data or data based on the set to the registered programs. As such, the processor 310 is caused to send the registered programs the information that the registered programs are interested in.

Registered programs can utilize the expirable data in various ways. For example, in the case of power consumption data, the programs can provide features, such as dynamic control of components. Additionally, because registered programs can receive information based on the set of data in near real-time, the programs can implement different functional purposes concurrently.

Figure 4:
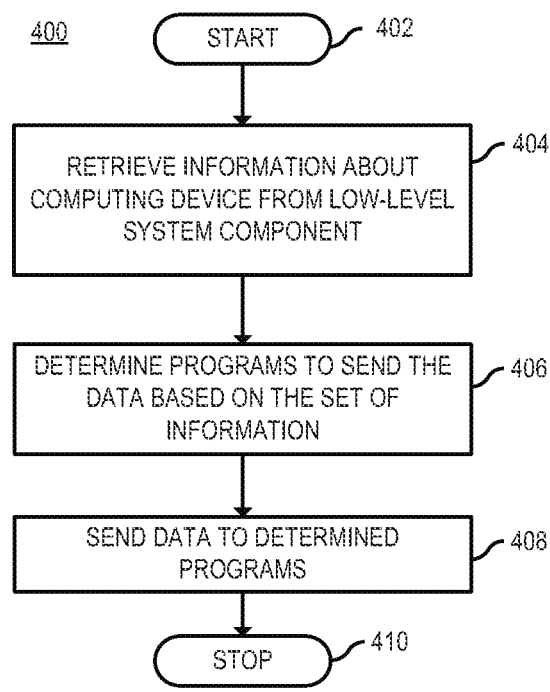
FIG. 4 is a flowchart of a method for distributing a set of time-sensitive information to programs, according to one example.

FIG. 4 is a flowchart of a method for distributing a set of time-sensitive information to programs, according to one example. The method 400 can be executed by a processor of a computing device or other suitable components. Additionally, the components for executing the method 400 may be spread among multiple devices (for example, nodes of the computing device). Method 400 may be implemented in the form of executable instructions stored on a machine-readable storage medium, and/or in the form of electronic circuitry.

Method 400 may start in 402 and proceed to 404, where a high-level system component of the computing device retrieves a set of information, for example, time-sensitive information, about the computing device 100 from a low-level system component. The high-level system component can be a part of the high-level system, for example, running at an operating system level of the computing device. The high-level system component and the low-level system component can further include subcomponents.

In certain embodiments, time-sensitive information is data that is relevant or applicable (for example, unexpired) for a short period of time. When the set of time-sensitive information is retrieved, the set is expired from the low-level system component's memory. As noted above, the time-sensitive information can include power usage data of other components (for example, power supply, display, radio, etc.) of the computing device. By way of example, the set can include a field for a component identifier and information associated with the component identifier. Further, the set can include a timestamp, an information type parameter or field designating what type of information is included in the set, a combination thereof, etc. This may be transferred as a header when receiving the set from the low-level system component.

At 406, the high-level system component determines a plurality of programs to send the set. This can be implemented by checking a data structure (for example, a data structure including subscription information of the programs) for mappings based on conditions or events. Further, the determination can be made based on rules. For example, the data structure can include a set of rules for whether and when to send the set to a particular program. A rule for the particular program can include sending the set to the program each time the information is read, sending multiple sets to the program after a certain count of times the set is read, sending processed information based on the set, combinations thereof, etc. Thus, data based on the set can be provided to subscriber programs.

Then, at 408, the high-level system component sends the set to the determined programs. The set can be processed or unprocessed. For example, the set can be formatted, filtered for outlying data points, or the like. Further, the set may be sent to the programs via an API of the high-level system. The programs can be internal to the computing device or external (for example, located on another computing device). The method then proceeds to 410, where the method ends.

Figures 5, 6:
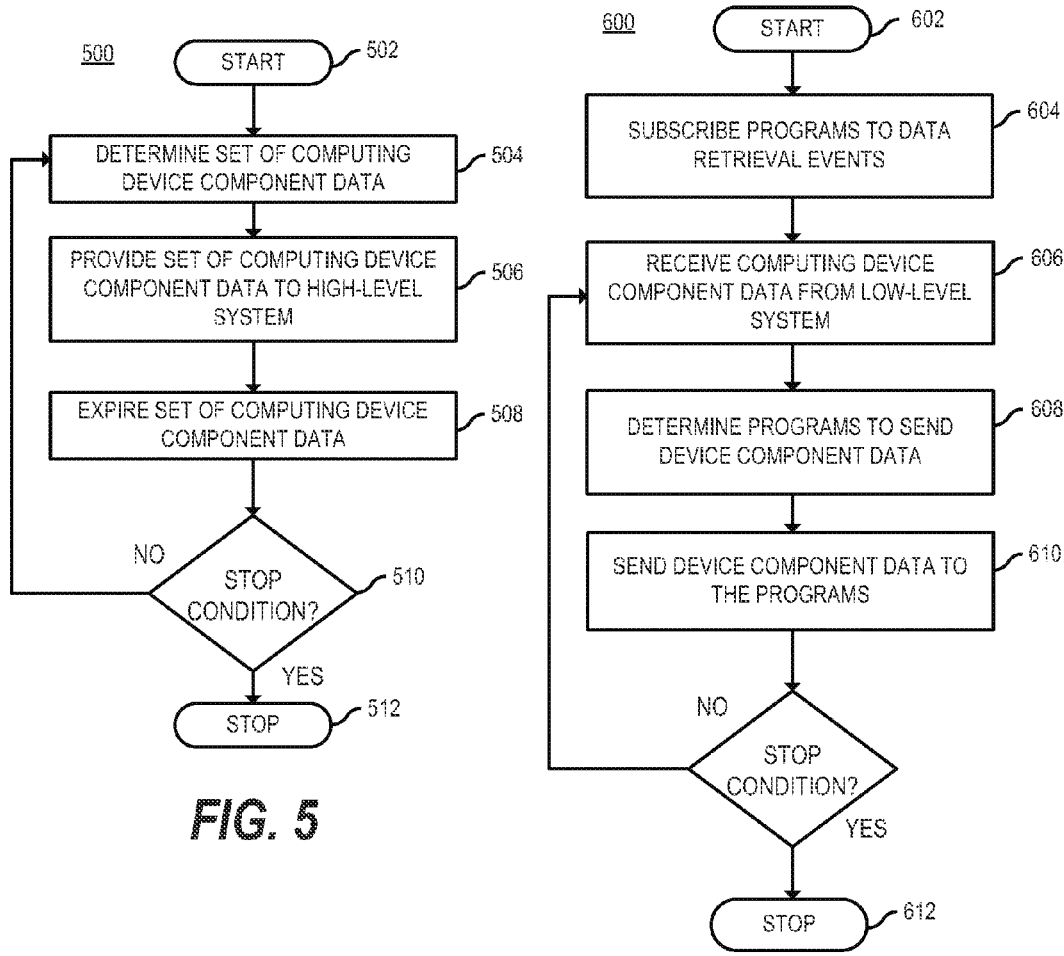
FIG. 5 is a flowchart of a method for determining, providing, and expiring device data at a low-level system, according to one example.
FIG. 6 is a flowchart of a method for subscribing and distributing device data, according to one example.

FIG. 5 is a flowchart of a method for determining, providing, and expiring device data at a low-level system, according to one example. The method 500 can be executed by a processor of a computing device or other suitable components. Additionally, the components for executing the method 500 may be spread among multiple devices. Method 500 may be implemented in the form of executable instructions stored on a machine-readable storage medium, and/or in the form of electronic circuitry.

In certain embodiments, a controller of a low-level system can perform the method 500. The controller can be implemented as part of a system BIOS. Further, the controller may be primarily focused on another function. For example, the controller may primarily be a keyboard controller utilized to interface with input from a keyboard. The keyboard controller may have additional pins, memory, or processing power that can be utilized to implement the method 500.

Method 500 may start in 502 and proceed to 504, where the computing device may determine a set of component data of the computing device. As previously noted, the component data may be time-sensitive or include power usage data. Moreover, the component data may indicate a usage rate (for example, memory utilization, processing utilization, network utilization, etc.) or other information about components of the computing device. The set can be determined by retrieving information from a component or multiple components of the computing device that calculate the information. Further, the set can be determined by calculating the information utilizing a circuit, such as a power monitor circuit.

The method 500 then proceeds to 506, where the controller provides the set of computing device component data to a high-level system. The controller can provide the set in response to a request by the high-level system. Further, the controller may send a ready signal to the high-level system when information is ready to be read. Additionally or alternatively, the controller may push the information to the high-level system by sending it without receiving a request.

Then, at 508, the controller expires the set of computing device component data. Expiring the set allows for another set of computing device component data to be collected. If, at 510, there is not a stop condition, the method 500 returns to 504 and continues with another set of computing device component data. If there is a stop condition, the method 500 ends at 512. In certain scenarios, the stop condition can be based on a register in the controller that indicates whether the method 500 should be executed or the computing device component data collected. Thus, the register can indicate that the method 500 need not be implemented or continued. The register or other setting can be set by the high-level system, for example, to indicate that no programs are subscribed to the information. If no programs are subscribed, there would be little need to collect the information. Moreover, different types of components or component data may be subscribed to. As such, the determination of sets of some types of component data can be continued while collection of other types of component data is stopped.

FIG. 6 is a flowchart of a method for subscribing and distributing device data, according to one example. The method 600 can be executed by a processor of a computing device or other suitable components. Additionally, the components for executing the method 600 may be spread among multiple devices. Method 600 may be implemented in the form of executable instructions stored on a machine-readable storage medium, and/or in the form of electronic circuitry.

Method 600 may start at 602 and proceed to 604, where a high-level system of computing device subscribes programs to data retrieval events. The high-level system provides an API to the programs allowing the programs to register or subscribe to certain types of information. Further, the subscriptions can be associated with event information utilized to trigger whether the set of information retrieved at the high-level system should be sent based on the subscription to the subscriber.

In one example, the high-level system receives a subscription request from a program (for example, a service, application, etc.). The subscription request can include the type of information to be subscribed to, the event information utilized to trigger whether to send received information to the subscriber, a combination thereof, etc. The type of information to be subscribed to may include a type of computing device component data, a particular component to monitor, a formatting of raw information to subscribe to, or the like. When the request is received, a subscription module can process the request. As such, the subscription module can generate subscription information if no subscription information has been previously recorded or update the subscription information to indicate that the subscriber is subscribed to the information. As detailed above, the component data may be time-sensitive, power usage data, usage rate data, or other types of data associated with the computing device.

The method 600 then proceeds to 606, where the high-level system receives a set of computing device component data from a low-level system. The component data can be determined at the low-level system. As such, when the set of component data is received (for example, by request and receipt of the set), the set is expired from the low-level system. As noted previously, the high-level system can request the set or have the set pushed to the high-level system.

At 608 the high-level system determines programs to send the computing device component data set. The determination can be based on the subscription information. For example, subscriber programs can be subscribed to particular types of computing device component data. Further, in certain scenarios, the subscriber programs can be subscribed to receive such information (for example, the set, a processed set, etc.) when an event fires. As such, the notification module determines any events that have occurred when it receives the set. If an event associated with a subscription occurs, the associated subscriber is determined to be sent a notification of the availability of the set, a processed set, information based on the set, or a combination thereof. Different events can be triggered based on the same set to different subscriptions. Once the determination is made, at 610, the high-level system sends device component data (for example, the set, processed set, etc.) to the subscriber programs interested in the information.

The method 600 can then continue receiving new sets of device component data from the low-level system at 606 unless a stop condition exists. A stop condition may occur if no programs are subscribed to the device component data, based on a setting, or the like. If the stop condition occurs, the method 600 stops at 612.

Subscriptions by programs can be added and unsubscribed by the programs via an API of the high-level system during the course of the method 600 or asynchronous of the method 600. For example, the subscriber can utilize an unsubscribe message to unsubscribe from receiving all information or particular subscriptions.

Figure 7:
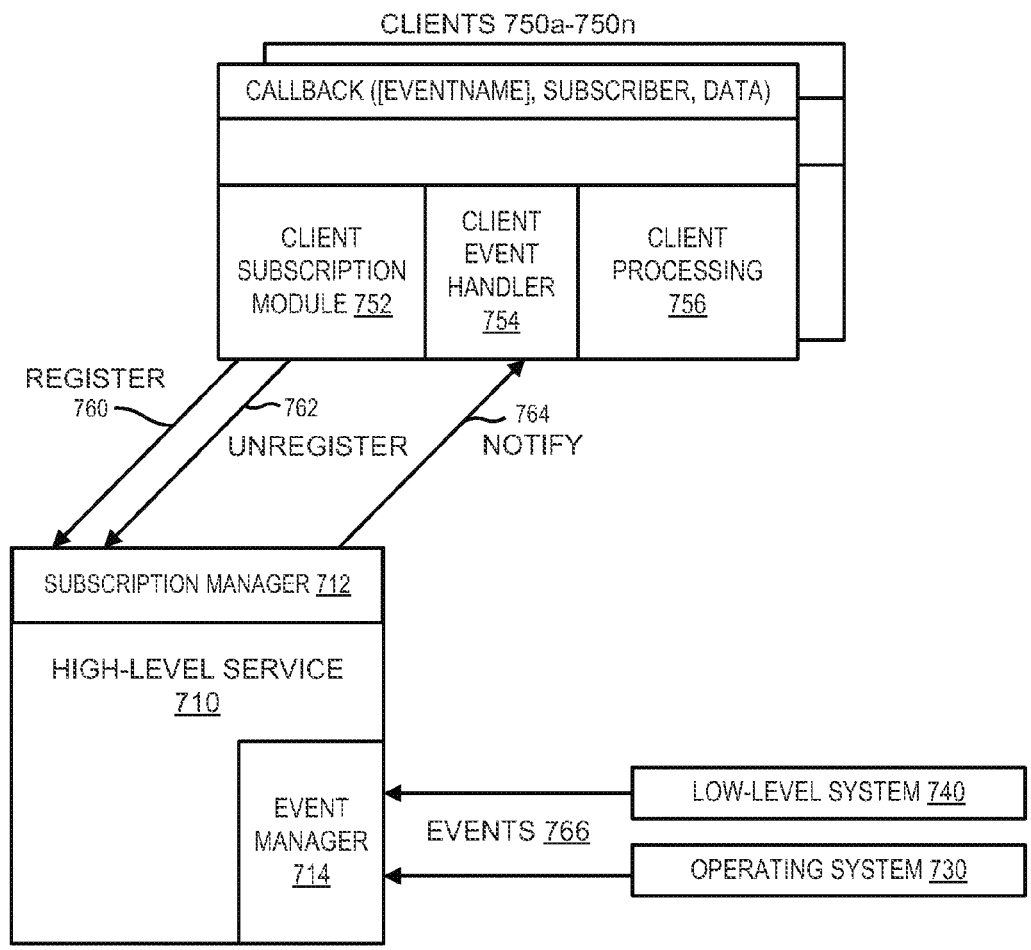
FIG. 7 is a block diagram of a system for distributing information captured at a low-level system based on subscription information, according to one example.

FIG. 7 is a block diagram of a system for distributing information captured at a low-level system based on subscription information, according to one example. The system 700 includes a high-level service 710 that includes a subscription manager 712 and an event manager 714. The high-level service 710 can run, for example, on an operating system 730 of a computing device. The high-level service 710 can retrieve information from a low-level system 740 to provide to clients 750a-750n.

As detailed above, the clients 750 can register 760 and unregister 762 with the subscription manager 712 (for example, via a client subscription module 752). Based on these messages, the subscription manager 712 can generate and update subscription information that can be utilized to determine when to send notification messages 764 to the client 750. As such, the subscription information can include an identifier of respective clients 750, an event or events that the respective clients are subscribed to receive information based on and the type of information to receive. Further, sent register 760 or unregister 762 messages can include an event identifier or name to subscribe to and a location to call back to (for example, an address and/or port associated with a client event handler 754). These can be used by the subscription manager 712 to call back to clients 750 to during notifications 764.

Some of these events 766 can be caused by the operating system 730 or low-level system 740. Additionally, the high-level service 710 may receive events from other programs or can determine events independently. In one example, an event is caused when the high-level service 710 retrieves information from the low-level system 740. In another example, operating system events, such as a timer, device events (for example, the addition or change in status of a device or peripheral to an input/output interface), or software events may be utilized to cause notifications 764. Moreover, the event manager 714 can determine other events based on information available to the event manager 714. For example, the client 750 can subscribe to and the event manager 714 can determine events based on multiples of when the low-level system 740 is retrieved. Further, some events can be associated with particular types of information retrieved by the high-level service 710. For example, the subscription of a client 750 may only be associated with a particular component from which the low-level system 740 retrieves information from.

When the client 750 receives a notification 764, the client 750 processes the information at client processing 756. In one scenario, the client 750 can be a power manager of the computing device and the client processing 756 includes turning on or turning off components of the computing device, performing other power optimization, combinations thereof, or the like. In another scenario, the client 750 can be another application, such as an internet browser application that modifies its use based on received notifications 764.

What is claimed is:

1. A computing device comprising:
a controller circuit to determine a set of power usage data for a plurality of low-level components of the computing device, the controller circuit and the low-level components being contained in a single computing device;
an event capture circuit to determine occurrence of an event;
a fetching circuit to fetch the set of power usage data based on occurrence of the event; and
a subscription circuit to determine, based on subscription information about a plurality of programs, whether the respective programs should be sent the set of power usage data in response to the event, and wherein the controller circuit expires the set when the set is fetched.

2. The computing device of claim 1, wherein the controller circuit is part of a low-level system that includes a power monitor circuit, and wherein the controller circuit interfaces with the power monitor circuit to determine the power usage data.

3. The computing device of claim 1, wherein the controller circuit determines a second set of power usage data after the set expires, wherein the event capture circuit determines a second event associated with the second set, and
wherein the subscription circuit determines a plurality of programs to which to send the second set based on the second event.

4. The computing device of claim 1,
wherein the subscription information includes respective identifiers of the programs and associated information types for which the respective programs are interested, and
wherein the set is determined to be sent to the respective programs that are interested in an information type associated with the set.

5. A method comprising:
retrieving a set of power usage information about a plurality of low-level components within a low-level system of a computing device from a low-level system component; the low-level system comprising a processor; power supply, storage interface and input/output interface,
wherein the set is expired upon retrieval; and
based on subscription information for a plurality of programs that are using an operating system of the same computing device; determining to which of the plurality of programs to send data based on the set of information about the plurality of low-level components.

6. The method of claim 5, further comprising:
receiving a request from one of the programs to subscribe to the information; and
updating subscription information to indicate that the one program is subscribed to receive the information,
wherein the determination of the programs is based on the subscription information.

7. The method of claim 6, wherein the subscription information includes event information and wherein the event information indicates an event that if triggered indicates that the set should be sent to the one program, the method further comprising:
determining that the event has been triggered, wherein the determination of the programs is further based on the triggered event.

8. The method of claim 5, wherein the information includes power usage data.

9. A non-transitory computer-readable storage medium storing instructions that, if executed by a processor, cause the processor to:
retrieve a set of power usage data about a plurality of components of a computing device from a low-level system of the computing device;
determine subscription information for a plurality of services for the power usage data, the services running on an operating system of the computing device;
publish the set to the services based on the subscription information; and
expire the set when the set is retrieved and published.

10. The non-transitory computer-readable storage medium of claim 9, further comprising instructions that, if executed by the processor, cause the processor to:
receive a subscription request for the power usage data from one of the services; and
update the subscription information to indicate that the one service is subscribed to receive the power usage data.

11. The non-transitory computer-readable storage medium of claim 9, further comprising instructions that, if executed by the processor, cause the processor to:
retrieve another set of the power usage data from the low-level system; and
publish the other set to the services based on the subscription information.

12. The non-transitory computer-readable storage medium of claim 11, wherein the low-level system collects the other set after the set is expired.

13. The non-transitory computer-readable storage medium of claim 9, wherein the low-level system includes at least one of a basic input output system (BIOS) and a keyboard controller.

14. The non-transitory computer-readable storage medium of claim 9, wherein the components include at least one of a networking module, a storage module, a presentation module, and a processor.

15. The computing device of claim 1, wherein the plurality of programs are executing on the computing device.

16. The computing device of claim 1, wherein the controller circuit replaces the set with a new set of power usage data in response to fetching of the set by the fetching circuit.

17. The computing device of claim 1, wherein the subscription information for each program comprises information indicating whether a respective program will receive the set based on what event has triggered a fetch of the set.

18. The computing device of claim 1, further comprising an operating system of the computing device, wherein the programs subscribing with the subscription circuit are executing on the operating system of the computing device and add functionality to the computing device based on the set.

19. The computing device of claim 1, further comprising a high-level system of the computing device comprising an application programming interface (API) to allow the programs to register or unregister subscriptions to the set with the subscription circuit.

* * * * *

UNITED STATES PATENT AND TRADEMARK OFFICE
CERTIFICATE OF CORRECTION

PATENT NO. : 9,740,587 B2
APPLICATION NO. : 13/876135
DATED : August 22, 2017
INVENTOR(S) : Christopher H. Stewart et al.

It is certified that error appears in the above-identified patent and that said Letters Patent is hereby corrected as shown below:

In the Claims

In Column 13, Line 13, in Claim 5, delete "component;" and insert -- component, --, therefor.

In Column 13, Lines 13-14, in Claim 5, delete "processor;" and insert -- processor, --, therefor.

In Column 13, Line 19, in Claim 5, delete "device;" and insert -- device, --, therefor.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*